(12) United States Patent
Badenberg et al.

(10) Patent No.: US 11,702,812 B2
(45) Date of Patent: Jul. 18, 2023

(54) CONTROLLING MOVEMENT OF A CANTILEVER STRUCTURE OF AN OFFSHORE PLATFORM

(71) Applicant: GustoMSC B.V., Schiedam (NL)

(72) Inventors: Theodorus Wilhelmus Maria Badenberg, Rotterdam (NL); René De Bruijn, Ooltgensplaat (NL)

(73) Assignee: GUSTOMSC B.V., Schiedam (NL)

( * ) Notice: Subject to any disclaimer, the term of this patent is extended or adjusted under 35 U.S.C. 154(b) by 333 days.

(21) Appl. No.: 17/198,966

(22) PCT Filed: Sep. 12, 2019

(86) PCT No.: PCT/NL2019/050592
§ 371 (c)(1),
(2) Date: Mar. 11, 2021

(87) PCT Pub. No.: WO2020/055250
PCT Pub. Date: Mar. 19, 2020

(65) Prior Publication Data
US 2021/0388568 A1    Dec. 16, 2021

(30) Foreign Application Priority Data
Sep. 13, 2018  (NL) ..................... 2021625

(51) Int. Cl.
*E02B 17/00* (2006.01)
*E21B 15/02* (2006.01)
(Continued)

(52) U.S. Cl.
CPC .......... *E02B 17/0017* (2013.01); *E21B 15/02* (2013.01); *E21B 41/00* (2013.01);
(Continued)

(58) Field of Classification Search
CPC ............... E02B 17/0017; E02B 17/021; E02B 2017/0056; E21B 15/02; E21B 41/00; E21B 15/003; G05B 15/02
See application file for complete search history.

(56) References Cited

U.S. PATENT DOCUMENTS 3,753,552 A * 8/1973 Barron .................... B66D 1/52
414/142.8
4,516,882 A * 5/1985 Brewer ................. E21B 43/017
405/206
(Continued)

FOREIGN PATENT DOCUMENTS

EP    2993620 A1    3/2016

OTHER PUBLICATIONS

International Search Report and Written Opinion—PCT/NL2019/050592—dated Dec. 5, 2019.

*Primary Examiner* — Ramesh B Patel
(74) *Attorney, Agent, or Firm* — Banner & Witcott, Ltd.

(57) ABSTRACT

For controlling movement of a cantilever of an offshore platform, displacements required for displacing an item to a target position including longitudinal skidding displacement and transverse skidding displacement of the cantilever of the cantilever are determined from current position data and target position data. From position dependent support load data support loads during the longitudinal skidding displacement are determined. If and until a sum of support loads or a highest support load decreases during the longitudinal skidding displacement towards the target position, the longitudinal skidding displacement precedes the transverse skidding displacement. If a sum of support loads or a highest support load increases during the longitudinal skidding displacement towards the target position, the transverse skidding displacement towards the target position precedes the longitudinal skidding displacement.

16 Claims, 3 Drawing Sheets

(51) Int. Cl.
  *E21B 41/00*     (2006.01)
  *G05B 15/02*     (2006.01)
  *E02B 17/02*     (2006.01)

(52) U.S. Cl.
  CPC ............ *G05B 15/02* (2013.01); *E02B 17/021* (2013.01); *E02B 2017/0056* (2013.01)

(56) References Cited

U.S. PATENT DOCUMENTS

| | | | |
|---|---|---|---|
| 8,960,116 B2 * | 2/2015 | van der Velde | B63B 35/44 114/56.1 |
| 9,695,565 B2 * | 7/2017 | Maini | B66C 23/20 |
| 10,315,733 B2 * | 6/2019 | Zijderveld | E21B 19/002 |
| 10,557,240 B2 * | 2/2020 | Krekel | E21B 15/003 |
| 10,745,983 B2 * | 8/2020 | Van Der Hoorn | E21B 19/22 |
| 11,198,985 B2 * | 12/2021 | Badenberg | G06V 10/245 |
| 11,414,938 B2 * | 8/2022 | Van Der Hoorn | E21B 15/003 |
| 11,499,282 B2 * | 11/2022 | Hofman | E02B 17/021 |
| 11,542,130 B2 * | 1/2023 | Woldring | B66C 23/707 |
| 2004/0060739 A1 * | 4/2004 | Kadaster | E02B 17/00 175/57 |
| 2008/0131209 A1 * | 6/2008 | Thomas | B63B 35/003 405/198 |
| 2012/0027523 A1 * | 2/2012 | Vanderbeke | F03D 13/10 405/195.1 |
| 2015/0034383 A1 * | 2/2015 | Roodenburg | E21B 15/003 405/196 |
| 2015/0259037 A1 * | 9/2015 | Eriksen | B63C 1/02 414/803 |
| 2017/0152713 A1 * | 6/2017 | Dowdy | E02B 17/00 |
| 2018/0044872 A1 | 2/2018 | Deul et al. | |

* cited by examiner

CONTROLLING MOVEMENT OF A CANTILEVER STRUCTURE OF AN OFFSHORE PLATFORM

CROSS-REFERENCE TO RELATED APPLICATIONS

This application is a U.S. National Stage application under 35 U.S.C. § 371 of International Application PCT/NL2019/050592 (published as WO 2020/055250 A1), filed Sep. 12, 2019, which claims the benefit of priority to Application NL 2021625, filed Sep. 13, 2018. Benefit of the filing date of these prior applications is hereby claimed. Each of these prior applications is hereby incorporated by reference in its entirety.

FIELD OF THE INVENTION

The invention relates to a method for controlling movement of a cantilever structure of an offshore platform, such as a jack-up platform or a self-elevating vessel or a semi-submersible, and to a system and a platform for carrying out such a method.

BACKGROUND TO THE INVENTION

Mobile offshore platforms can for example be operated to drill for hydrocarbons or to install offshore structures. For drilling operations, a drilling floor and drilling derrick are usually placed on an end of a cantilever structure such that when the cantilever structure is retracted, the drill floor and the derrick are substantially within the bounds of the floating platform, for example in the form of a buoyant hull. In this configuration the platform can be moved from one drilling location to another, usually by being towed, or, in some embodiment, self-propelled.

Once on location, for instance, when utilizing a jack-up platform for drilling purposes, the platform is elevated above the sea level such that it is generally clear from waves. This can be done typically by lowering legs of the jack-up platform to the seabed and jacking up the platform along the legs which are then supported by the seabed. Next, the cantilever structure can be extended out of the platform, such that the drilling center is outside the platform and a well can be approached and/or drilled and constructed in that position. This can be over open water or over a fixed structure positioned on the seabed.

In particular when drilling over an existing fixed structure resting on the seabed, such as a jacket, reaching various well positions involves movement of the cantilever structure relative to the platform for maneuvering the cantilever structure, and thus the drilling derrick on it, from one well to another. Movement of the cantilever structure can be in X direction (longitudinal direction of the cantilever), Y direction (horizontal perpendicular to the X direction), in psi direction (rotation about a vertical axis), or any combination thereof.

Maintenance of a movable cantilever arrangement of an offshore platform is costly and maintenance time reduces operational time of the platform. Also, displacement of the cantilever requires exertion of very high forces and drives used for that purpose consume power at a level that requires selective use to keep overall required power below available power, which has to be generated locally.

SUMMARY OF THE INVENTION

It is an object of the present invention to provide a method that reduces maintenance requirements of an offshore platform.

According to the invention, this object is achieved by providing a method according to claim 1. The invention can also be embodied in a control system according to claim 10 and in a computer program product according to claim 12. Particular embodiments of the invention are set forth in the dependent claims.

Forces exerted on the supports that support the cantilever determine contact pressure between the supports and skidding guides along which the supports are movable. Thus, wear of the skidding bodies forming anti-friction parts of the supports, e.g. aluminum bronze skid pads or rollers, per unit of distance of displacement along the skidding guides, depends on the forces exerted via the supports. Also the force and the power required to move the object cantilever, and accordingly wear of the cantilever displacement drive, depends on the loads exerted via the supports. By determining a displacement trajectory from a current portion to a required position in which the forces exerted via the supports are low, wear of the anti-friction arrangement of the supports and of the cantilever displacement drive and required and consumed power can be reduced.

During movement of the cantilever between a forward (retracted) position and an aft (extended) position, the forces transferred via the aft and forward supports will change, more in particular, the aft support loads may change from tension loads to compression loads and the forward support loads may change from compression to tension loads. If, for instance, the center of gravity of the cantilever is located forwardly of the forward supports, the aft supports will be loaded in upward direction, which upward (tension) forces add, in downward direction (compression), to the forces to which the forward supports, which also carry the full weight of the cantilever, are subjected in that situation. If the cantilever is partially retracted or extended such that the center of gravity of the cantilever and any items carried thereby becomes located between the forward and aft supports, the downward forces exerted by the cantilever are distributed over the forward and aft supports, so that the sum of the exerted loads is reduced and more evenly distributed.

Thus, if a movement from a starting position to a target position involves for instance movement in X and Y directions, it is preferred to carry out the movement in the Y direction after the cantilever has been displaced ill X direction between the current starting position and the target position, if the forces transferred via the supports are lower and/or better distributed after the displacement in the X-direction. Conversely, if the forces transferred via the supports are higher and/or less well distributed after the displacement ill the X-direction, it is preferred to carry out the movement in the Y direction before the cantilever has been displaced in X direction. It may also be that during movement in X-direction, initially, the forces transferred via the supports become lower and/or better distributed and, after a first portion of the displacement in X-direction has been completed, during a second portion of the displacement in X-direction, the forces transferred via the supports become higher and/or less well distributed. In such a situation it is preferred that first the first portion of the displacement in X-direction is carried out, subsequently the displacement in Y-direction is carried out with lowest and/or optimally distributed forces transferred via the supports, and finally the second portion of the displacement in X-direction completing displacement towards the target position is carried out.

Depending on the criticality, the sensitivity of wear as a function of forces transferred, the distribution of remaining wear capacity over the supports and the locations of the starting position and the target position, it can be advantageous to move longitudinally via intermediate positions further forward or aft than both the current starting position and the target position, in which intermediate positions the forces exerted via the supports are further reduced or better distributed compared with the forces exerted via the supports in a range of positions in X direction between the current starting position and the target position. Then, the skidding distance of the low wear trajectory in X-direction will be longer than the corresponding skidding distance in X-direction of the shortest trajectory. This can be more than compensated for by reduced wear and power consumption during displacement in Y-direction.

Whether this requirement is met can be determined by determining whether an integral of the support wear over the longitudinal and transverse displacements is lower than an integral of the support wear over the longitudinal and transverse displacements without the extra longitudinal skidding displacement away from the target position. The support wear loads can be calculated from a wear function of wear and support force and from determined support load forces exerted via the supports.

The exerted force per support as a function of the cantilever position can be calculated, measured or calculated by extrapolation or interpolation from measurements of the loads in various positions.

For calculating the forces exerted via the supports as a function of the cantilever position without any measurement, parameters defining the weight and the location of the center of gravity of the cantilever, the position of the cantilever, weight and the location of the center(s) of gravity of item(s) carried by the cantilever and the locations of the supports are stored into a control system.

For measuring the forces exerted via the supports, load sensors at the supports can be used. The measured forces can be used for calibrating the parameters defining the weight and the location of the center of gravity of the cantilever. The system can also incorporate one or more sensors of various items on/in the cantilever, e.g. a position indicator, a mud tank level indicator and/or a load sensor.

Data and parameters indicative of the forces exerted via the supports can also be received from an external system, e.g. an Operational Support System. Control of the cantilever movement may also take into account boundaries within which movements of the cantilever should remain confined, as is disclosed in Dutch patent application 2 018 499.

The trajectory may be determined in accordance with load parameters reflecting wear sensitivity as a function of exerted force and maintenance costs of various supports and drives. Thus, if for instance replacement of worn anti-friction material of a given support is particularly costly and/or requires a particularly long out of service time during which the cantilever cannot be used, parameters can be used to optimize displacement trajectories for reducing loads of in particular that support. Also, it is generally advantageous to replace all skidding bodies if a cantilever is out of operation for maintenance anyway. Accordingly, it can be advantageous to most heavily load the ones of the skidding bodies that are worn least. To this end, the wear function for each support may be adapted in response to a calculated or measured wear of that support or of the relevant skidding body of that support, so that adapted support wear is increased in response to remaining operational wear capacity of that support or skidding body being reduced. More in particular, adapted support wear may be expressed as a fraction of remaining operational wear capacity.

Particular elaborations and embodiments of the invention are set forth in the dependent claims. Further features, effects and details of the invention appear from the detailed description and the drawings.

DETAILED DESCRIPTION

Figure 1:
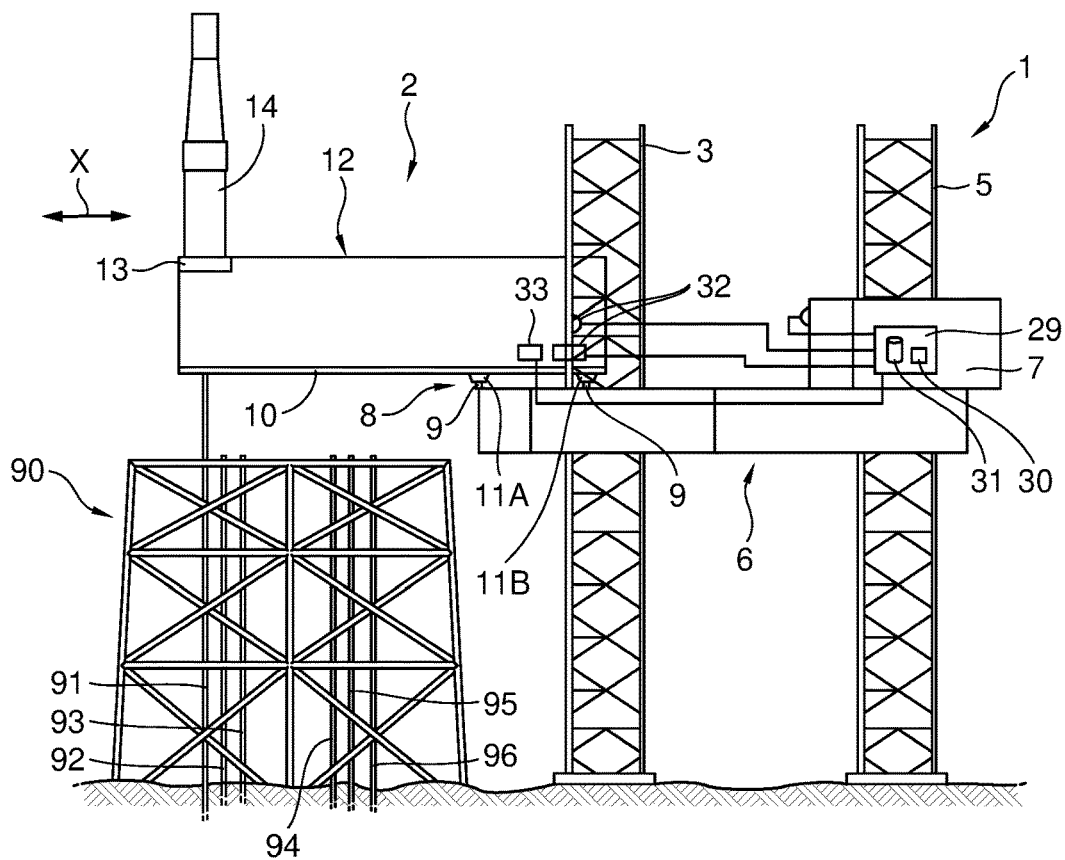
FIG. 1 is a schematic side view of an offshore platform with a first example of a cantilever structure according to the invention.

The invention is first discussed with reference to FIGS. 1 and 2 which show an example of an offshore platform in the form of a jack-up platform 1 with a cantilever structure 2 projecting substantially horizontally from a platform hull 6 of the jack-up platform 1. The jack-up platform 1 according to the present example has three legs 3, 4, 5 carrying the platform hull 6, which is displaceable in vertical direction along the legs 3, 4, 5. Depending on various requirements, the number of legs may also be different, e.g. one, two, four, five, six or more legs. In this embodiment a cabin 7 accommodating control facilities, machinery and providing shelter or housing for a crew is arranged on the platform hull 6 at a forward side opposite of an aft side from which the cantilever structure 2 projects. In this example, the cantilever structure 2 projects aft from an aft side of the vessel. However, in principle, the cantilever structure may also project generally horizontally from another side of the vessel. The control facilities may also be positioned elsewhere, e.g. on the cantilever or on the deck of the platform, or portable remote control may be used. The cantilever structure 2 is composed of a cantilever guide 8 and a cantilever 12 guided thereby.

The cantilever guide 8 is in the form of a skidding system having a fixed part in the form of transverse rails 9 fixedly mounted to the platform hull 6 of the jack-up platform 1 and a movable part 10, guided for guided movement relative to the fixed part 9. The movable part 10 of the cantilever guide 8 is formed by longitudinal rails 10 that are part of the elongated cantilever 12. In the present example two rails are provided, but other numbers of rails and/or other longitudinal guides and/or traction providing structures are also conceivable.

Supports 11A-11D are guided by the rails 9 for guided displacement along the rails 9 so that the cantilever 12 is displaceable in substantially horizontal, transverse directions Y of the transverse rails 9, between extreme port and starboard positions. The cantilever 12 is guided to move over the supports 11A-11D by its longitudinal rails 10 guided by the supports 11A-11D, along a trajectory in substantially horizontal longitudinal X direction between a most proximal position and a most distal position while the supports 11A-11D are held stationary relative to the transverse rails 9. Displacement in other selected directions can be achieved by combination of movement of the supports 11A-11D along the transverse rails 9 and movement of the cantilever 12 with its longitudinal rails 10 over the supports 11A-11D. Each support 11A-11D has a skidding body guided by a longitudinal rail 10 and a skidding body guided by a transverse rail 9. During displacement in X-direction support loads determine wear of the skidding bodies guided by the longitudinal rails 10 and during displacement in Y-direction support loads determine wear of the skidding bodies guided by the transverse rails 9 occurs. Thus, for displacement in X-direction support loads are relevant for the skidding bodies guided by the longitudinal rails 10 and for displacement in Y-direction support loads are relevant for the skidding bodies guided by the transverse rails 9.

For examples of further details of supports and means for controlling displacements of the supports along the rails, reference is made to U.S. Pat. No. 6,171,027. The supports 11A-11D may also be mutually connected forming parts of a common intermediate member of the cantilever guide. In this example, a so-called X-Y cantilever skidding system is used that allows movement of the cantilever 12 in longitudinal (X) directions and transverse (Y) directions. Other cantilever guide arrangements can be provided for instance a guide arrangement allowing movement in X and Psi directions, i.e. allowing longitudinal and horizontal pivotal angular movement. Many variants are possible, such as a guide allowing movement in X and Y directions as well as pivotal Psi movement.

The cantilever 12 projects from the fixed part 9 of the cantilever guide 8 and, in this example, has a drilling platform 13 carrying a drilling tower 14 at a distal end of the cantilever structure 2 for instance for performing drilling and other operations such as plugging wells 91-96 performed over a fixed platform 90. Instead of a drilling platform with a drilling tower or other rotary facilities, the cantilever structure may also carry a different well drilling or intervention facility, such as a crane or other equipment for performing operations such as well construction, maintenance, work over, plug and abandonment and/or installation of wind turbine or other natural energy converting installations. The cantilever structure 2 may also comprise a secondary cantilever carrying any of said facilities.

Free space for the movement of the cantilever 12 can be limited due to the presence of boundary limiting elements, such as jack-up platform legs 3-5 including their related jacking houses and/or other items, such as accommodation housing 7, projecting upwardly from or arranged on top of the platform hull 6. Free space may also be limited by an adjacent fixed structure, such as fixed platform.

During transit and installation, the cantilever structure 2 is preferably retracted further inboard than in the distal position and sea-fastened. In the retracted position, the cantilever 12 and any facilities mounted thereto are preferably completely inboard of the platform, but a, preferably small, portion of the cantilever and/or of any facilities mounted thereto may still project outside of the platform 1.

Figure 2:
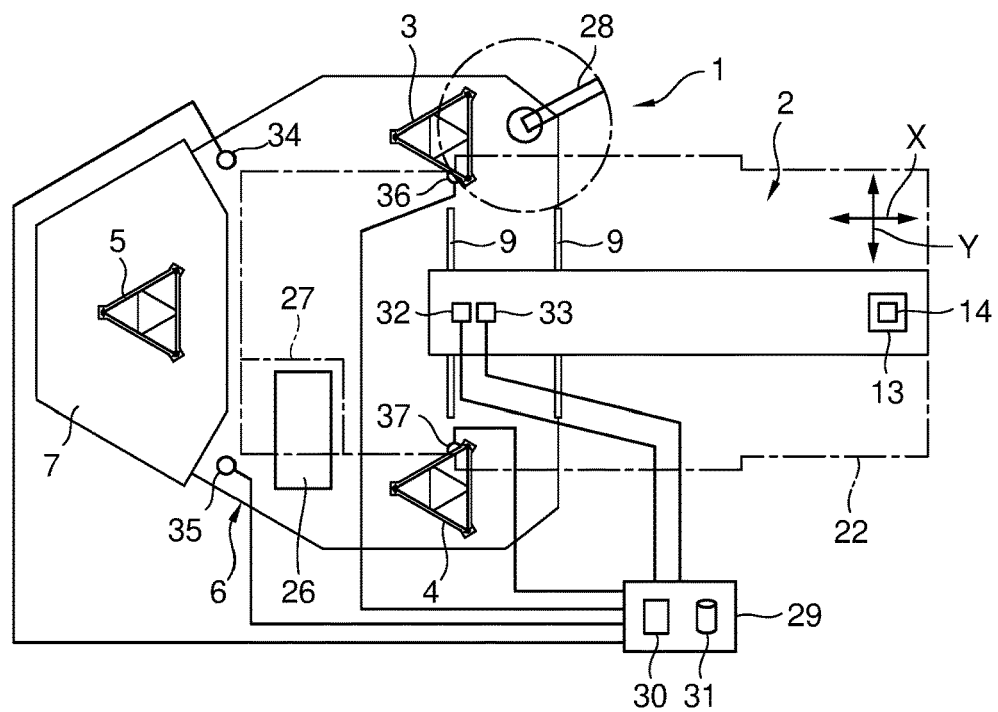
FIG. 2 is a schematic top plan view of the platform shown in FIG. 1.

In FIG. 2, a theoretical maximum operational envelope 22 in top plan view of the area potentially occupied by the cantilever structure 2 is shown. The theoretical maximum operational envelope 22 is determined by maximum reach of the movement system, such as the X-Y skidding system of the embodiment of FIG. 1 and FIG. 2. Here, the boundary model contains only boundary limiting information about the maximum reach of the movement system, defining the boundaries of movement of the cantilever, resulting in the maximum theoretical operational envelope. In this embodiment, the maximum reach is therefore substantially rectangular. It is to be understood that the maximum operational envelope determined by the maximum reach of the movement system can have different shapes depending on the movement system and the presence of boundary limiting elements.

Figure 3:
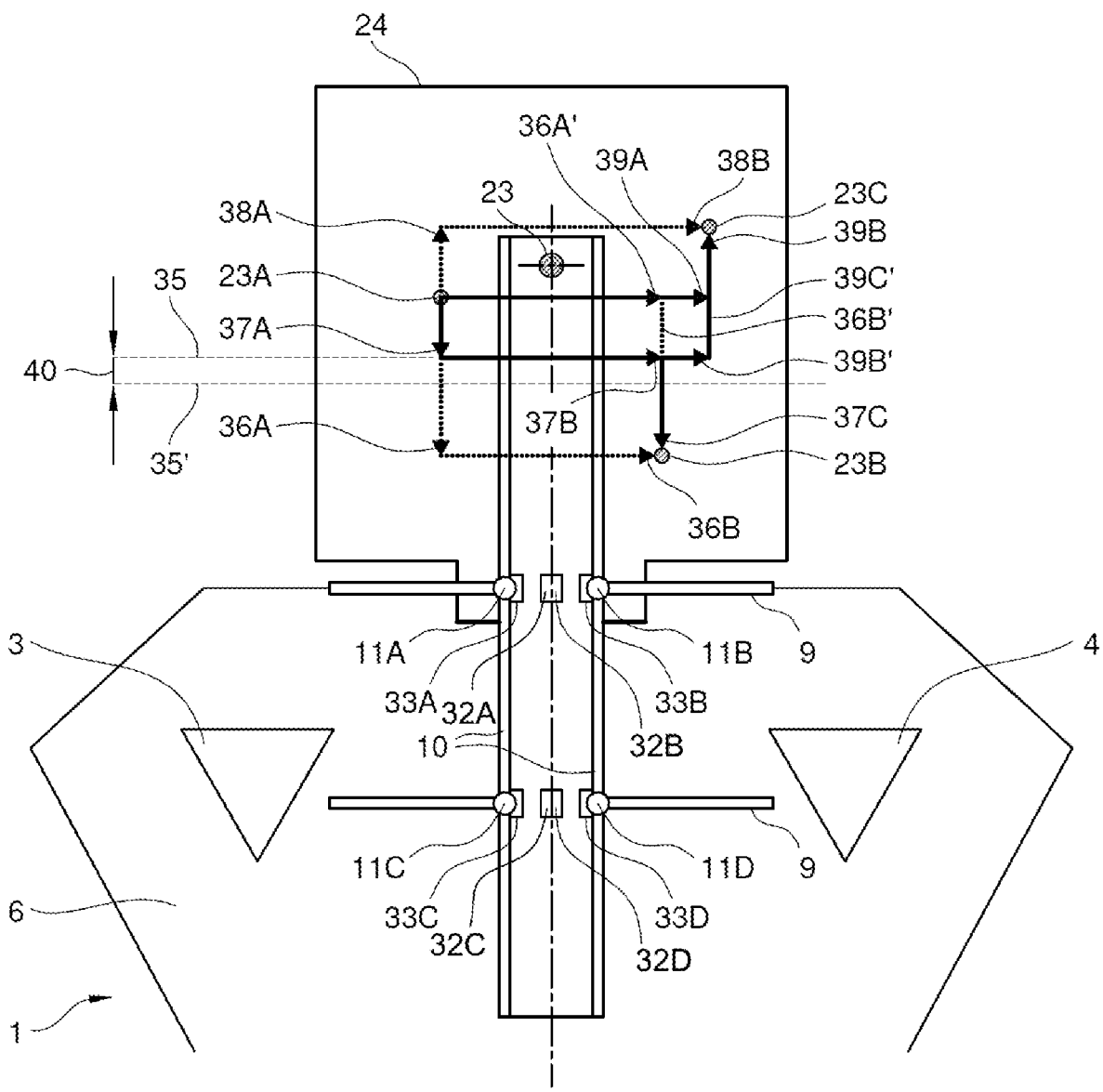
FIG. 3 shows an example of a trajectory from a current position to a target position.

In FIG. 3, the platform 6 is more schematically represented and two of its legs 3, 4 are shown. A reference point 23 of the cantilever 12 is shown. In this example, the reference point 23 is constituted by a drilling axis of the drilling tower 14. For driving displacements of the drilling axis 23, the following drives are provided:

| | |
|---|---|
| movement of the cantilever 12 relative to the platform 6 in X-directions | cantilever X-drives 32A-32D |
| movement of the cantilever 12 relative to the platform 6 in Y-directions | cantilever Y-drives 33A-33D |

As movement of the cantilever 12 is often intended to bring the drilling tower 14 in a desired position, e.g. above a well center of a jacket platform, it is for the operator convenient to have the chilling tower 14 as the reference point. This may also be visualized as such onto the interface accessible for the operator. In this example, the drilling axis 23 can be moved within the boundary envelope 24.

When controlling movement of the cantilever structure 2, movement may automatically be controlled to be restricted to movement within the boundary envelope 24 as is described in Dutch patent application 2 018 499.

For controlling movement of the cantilever structure to bring the drilling axis 23 from a current starting position 23A to a target position 23B, a conventional approach would be, to control the drives 32A-32D and 33A-33D to first skid the cantilever 12 in X-direction along the guides 10 so that the chilling axis 23 moves along trajectory 36A and to subsequently skid the cantilever 12 transversely along the guides 9 in the Y-direction so that the drilling axis 23 moves along trajectory 36B to the target position 23B. Alternatively, the cantilever 12 would first be skidded in Y-direction along the guides 9 so that the drilling axis 23 moves along trajectory 36A' and subsequently be skidded longitudinally along the guides 10 in the X-direction so that the drilling axis 23 moves along trajectory 36B' to the target position 23B.

In FIG. 3, a line 35 indicates positions of the drilling axis 23 that are associated to positions in which the cantilever 12 including items and other loads carried thereby, such as a drilling tower and a chilling floor is balanced relative to a line centrally between the guides 9, so that forces transferred via the supports 11A-11D are low and most evenly distributed. In that position in X-direction, skidding of the cantilever 12 in Y-direction along the guides 9 entails a small and most evenly distributed amount of wear per unit of distance of displacement. It is noted that if the aft guide 9 and associated supports 11A, 11B are dimensioned differently from the forward guide 9 and associated supports 11C, 11D, the position in X-direction in which wear per unit of skidding displacement is most evenly distributed may be located further forward or aft.

As the position of the cantilever in X-direction is further away from a position in which the drilling axis 23 is on line 35, forces transferred via at least some of the supports 11A-11D are higher and skidding in Y-direction along the supports 9 entails more wear of these supports per unit of skidding displacement.

Figure 4:
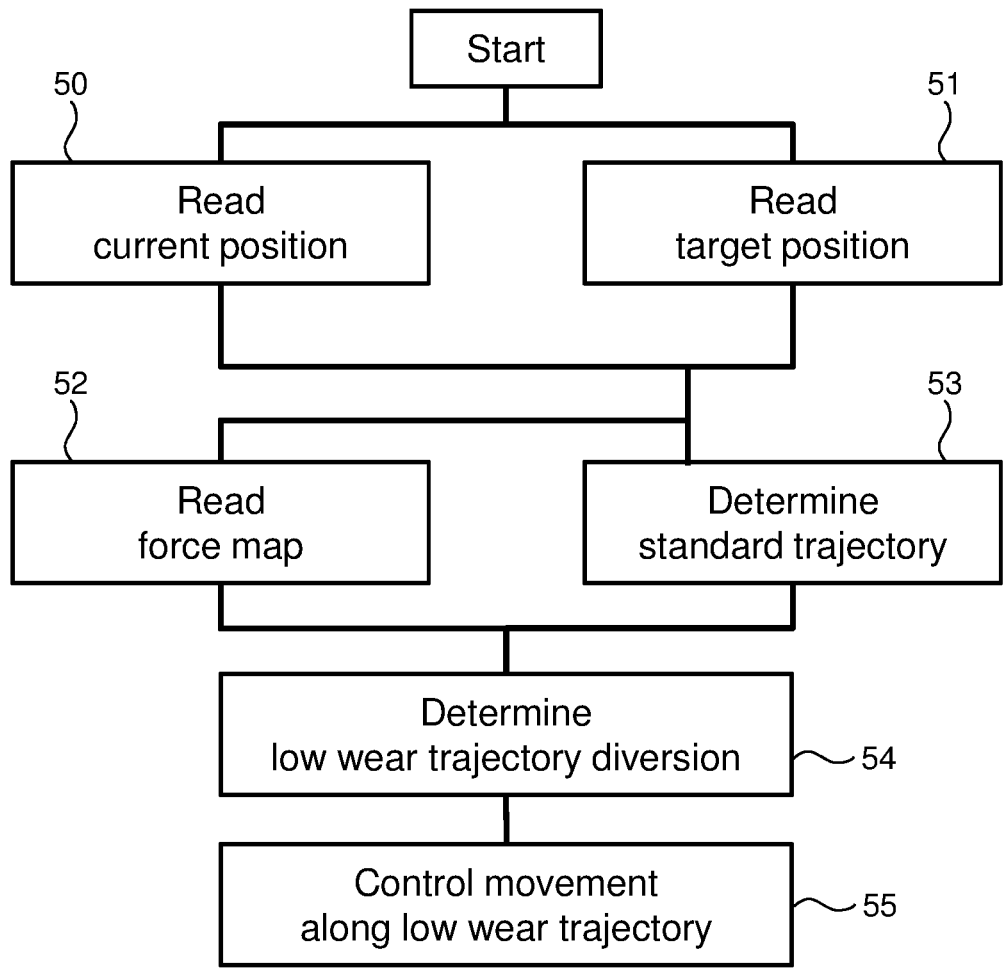
FIG. 4 is flow chart of an example of a method according to the invention.

According to the present example, a trajectory is determined by applying a method represented by the flow chart shown in FIG. 4. First, current position data representing a current position 23A of the drilling axis 23 of the cantilever structure 2 and target position data representing a target position of the drilling axis are read by the control system (steps 50 and 51). The current position may for instance be read from position sensors of the cantilever or be copied from target position data of a previous displacement. The new target position data may for instance be inputted by an operator or read from a system in which successive positions of the drilling axis have been stored previously.

Then position dependent support load data associating support loads to a plurality of positions of the drilling axis 23 are read (step 52). These data may for instance be represented by a map associating co-ordinates of positions in that map to support loads. Also, a standard or initial trajectory for displacement from the current, starting position 23A to the target position 23B is determined (step 53). The initially determined trajectory may for example be a trajectory formed by displacement 36A in X-direction followed by displacement 36B in Y-direction. This displacement involves skidding of the cantilever 12 in X-direction in which the guides 10 move along associated ones of the supports 11A-11D and, subsequently, skidding in Y-direction in which the supports 11A-11D skid along associated ones of the guides 9.

Then, a low wear trajectory 37 from the current position 23A to the target position 23B is determined from the current position data, the target position data and the position dependent support load data (step 54) and then movement of the cantilever structure 2 is controlled by controlling cantilever skidding drives 32A-32D-and 33A-33D to follow that trajectory (step 55).

In this example, the low wear trajectory is composed of sections 37A-37C in which skidding along different guides 9, 10 is carried out sequentially.

Movement along a first section 37A of the trajectory is achieved by skidding the cantilever in X-direction towards a position in which the drilling axis 23 is on line 35, where forces are distributed evenly between, on the one hand, aft supports 11A and 11B and, on the other hand, forward supports 11C and 11D. In that intermediate position, forces are also evenly distributed between the guide rails 9.

With the supports 11A-11D now most evenly loaded further skidding in X-direction to the X-coordinate of the target position 23B would entail an increasingly uneven distribution of loads between, on the one hand, aft supports 11A and 11B and, on the other hand, supports forward supports 11C and 11D, Therefore, the next movement is ill Y-direction with the supports 11A-11D most evenly loaded along a second section 37B of the trajectory by skidding the supports 11A-11D along the guide rails 9 until the cantilever 12 reaches the required position in Y-direction corresponding to the Y coordinate of the target position 23B.

Then, movement along a third section 37C of the trajectory is achieved by skidding the guide rails 10 along the supports 11A-11D in X-direction until the cantilever 12 reaches the required position in X-direction corresponding to the X coordinate of the target position 23B as well, so the drilling axis 23 reaches the target position 23B.

Thus because skidding movements that result in lowering support loads and/or an even distribution of support loads are carried out first, then skidding with reduced and/or evenly distributed support loads is carried out and then skidding for a final approach of the target position is carried out, wear of the skidding pads and/or skidding rollers is reduced and or more evenly distributed, so that maintenance intervals of the skidding pads and/or skidding rollers can be extended. Also, reduced support loads during skidding reduce the amount of power that is required for skidding and/or allow faster skidding.

The support loads may be forces exerted via the supports, but may alternatively be loads expressed in terms of support wear, or more specifically wear of skidding bodies wear, such as skidding pads and/or skidding rollers. Such wear loads can be calculated from a wear function and support forces exerted via said supports. Thus, differences in resistance to wear of different guides and/or of different supports guided thereby may be taken into account when determining optimal intermediate skidding positions. Also wear loads can be expressed in relation to remaining wear capacity for shifting further wear from skidding bodies that are worn to a relatively large extent, to skidding bodies that are worn to a relatively small extent. The extent to which skidding bodies are worn can for instance be determined from historic wear load data and displacements, from measurements of the skidding bodies and/or from signals from (partial) wear sensors.

Such a wear function may be a non linear function which is progressive, at least beyond a given support force level.

The position dependent support load data may be calculated from a cantilever center of gravity position, cantilever weight, cantilever load weight, cantilever load center of gravity and support positions or be calculated by extrapolation or interpolation of measured support forces in at least two different positions.

Where parts are described as fixedly mounted, the mounting may be permanently fixed or removably or releasably fixed, the latter allowing dismounting or adjustment of the mounting position. In the retracted position, the cantilever structure may be fully retracted within a top plan view contour of the jack-up platform or project horizontally outside of that contour, but less far than in the distal position. Similarly, in the retracted position, the secondary cantilever may be fully retracted in the longitudinal direction relative to the primary cantilever or project horizontally in longitudinal direction beyond the primary cantilever, but less far than in the distal position.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

Several features have been described as part of the same or separate embodiments. However, it will be appreciated that the scope of the invention also includes embodiments having combinations of all or some of these features other than the specific combinations of features embodied in the examples.

The invention claimed is:

1. A method for controlling movement of a cantilever structure of an offshore platform, the cantilever structure being elongate in a longitudinal (X) direction and coupled to a hull of the platform via supports and skidding guides, the supports and the skidding guides being arranged for guided skidding displacement of the supports along associated ones of the skidding guides, the method comprising:
reading current position data representing a current position of an item on or of the cantilever structure;
reading target position data representing a target position of said item;
reading position dependent support load data associating support loads to at least a plurality of positions of said item;
determining, from the current position data and the target position data, displacements required for displacing said item to said target position including longitudinal skidding displacement of first ones of the supports of the cantilever in said longitudinal (X) direction and transverse skidding displacement of second ones the supports of the cantilever of the cantilever in a horizontal direction transverse to said longitudinal direction;

determining from said position dependent support load data support loads during said determined longitudinal skidding displacement;

determining a low wear trajectory of said item from said current position to said target position in which, if and until a sum of support loads or a highest support load decreases during said longitudinal skidding displacement towards the target position, said longitudinal skidding displacement towards the target position precedes said transverse skidding displacement and, if a sum of support loads or a highest support load increases during said longitudinal skidding displacement towards the target position, said transverse skidding displacement towards the target position precedes said longitudinal skidding displacement; and controlling movement of the cantilever structure to follow said low wear trajectory.

2. The method according to claim 1, further comprising a longitudinal skidding displacement away from the target position preceding said transverse skidding displacement if support loads during said longitudinal skidding displacement away from said target position are lower than said support loads during said longitudinal skidding displacement towards said target position.

3. The method according to claim 2, further comprising a longitudinal skidding displacement away from the target position preceding said transverse skidding displacement if an integral of support wear over said longitudinal and transverse displacements is lower than an integral of said support wear over said longitudinal and transverse displacements without said longitudinal skidding displacement away from the target position, said support wear being calculated from a function of wear and support force and from determined support load forces exerted via said supports.

4. The method according to claim 3, wherein the wear function is a non linear function which is progressive, at least beyond a given support force level.

5. The method of claim 3, further comprising adapting said wear function for each support or skidding body in response to a calculated or measured wear of that support or skidding body, so that adapted support wear is increased in response to remaining operational wear capacity of that support or skidding body being reduced.

6. The method of claim 5, wherein adapted support or skidding body wear is expressed as a fraction of remaining operational wear capacity.

7. The method according to claim 1, wherein the position dependent support load data represent a map of positions of said item and associated support loads.

8. The method according to claim 1, wherein the position dependent support load data are calculated from a cantilever center of gravity position, cantilever weight, cantilever load weight, cantilever load center of gravity and support positions.

9. The method according to claim 1, wherein the position dependent support load data are calculated by extrapolation or interpolation of measured support forces.

10. The method of claim 1, wherein the offshore platform is a jack-up platform or a self-elevating vessel.

11. A system for controlling movement of a cantilever structure of an offshore platform, the cantilever structure being elongate in a longitudinal (X) direction and coupled to a hull of the platform via supports and skidding guides, the supports and the skidding guides being arranged for guided skidding displacement of the supports along associated ones of the skidding guides, the system being arranged for:

reading current position data representing a current position of an item on or of the cantilever structure;

reading target position data representing a target position of said item;

reading position dependent support load data associating support loads to at least a plurality of positions of said item;

determining, from the current position data and the target position data, displacements required for displacing said item to said target position including longitudinal skidding displacement of first ones of the supports of the cantilever in said longitudinal (X) direction and transverse skidding displacement of second ones the supports of the cantilever of the cantilever in a horizontal direction transverse to said longitudinal direction;

determining from said position dependent support load data support loads during said determined longitudinal skidding displacement;

determining a low wear trajectory of said item from said current position to said target position in which, if and until a sum of support loads or a highest support load decreases during said longitudinal skidding displacement towards the target position, said longitudinal skidding displacement towards the target position precedes said transverse skidding displacement and, if a sum of support loads or a highest support load increases during said longitudinal skidding displacement towards the target position, said transverse skidding displacement towards the target position precedes said longitudinal skidding displacement; and controlling movement of the cantilever structure to follow said low wear trajectory.

12. An offshore platform comprising a system according to claims claim 11.

13. The offshore platform of claim 12, wherein the offshore platform is a jack-up platform or a self-elevating vessel.

14. The system of claim 11, wherein the offshore platform is a jack-up platform or a self-elevating vessel.

15. A computer program product comprising a non-transitory computer readable medium having instructions thereon that, when executed by a computer, perform a method for controlling movement of a cantilever structure of an offshore platform, the cantilever structure being elongate in a longitudinal (X) direction and coupled to a hull of the platform via supports and skidding guides, the supports and the skidding guides being arranged for guided skidding displacement of the supports along associated ones of the skidding guides, the method comprising:

reading current position data representing a current position of an item on or of the cantilever structure;

reading target position data representing a target position of said item;

reading position dependent support load data associating support loads to at least a plurality of positions of said item;

determining, from the current position data and the target position data, displacements required for displacing said item to said target position including longitudinal skidding displacement of first ones of the supports of the cantilever in said longitudinal (X) direction and transverse skidding displacement of second ones the supports of the cantilever of the cantilever in a horizontal direction transverse to said longitudinal direction;

determining from said position dependent support load data support loads during said determined longitudinal skidding displacement;

determining a low wear trajectory of said item from said current position to said target position in which, if and until a sum of support loads or a highest support load decreases during said longitudinal skidding displacement towards the target position, said longitudinal skidding displacement towards the target position precedes said transverse skidding displacement and, if a sum of support loads or a highest support load increases during said longitudinal skidding displacement towards the target position, said transverse skidding displacement towards the target position precedes said longitudinal skidding displacement; and controlling movement of the cantilever structure to follow said low wear trajectory.

16. The computer program product of claim 15, wherein the offshore platform is a jack-up platform or a self-elevating vessel.

* * * * *